United States Patent
Nakazawa et al.

(10) Patent No.: US 6,876,531 B2
(45) Date of Patent: Apr. 5, 2005

(54) DEVICE FOR DETECTING FAILURE OF FIELD EFFECT TRANSISTOR

(75) Inventors: Yuichi Nakazawa, Shizuoka (JP); Yasuyuki Mochizuki, Shizuoka (JP); Yasushi Nakamura, Shizuoka (JP); Susumu Yamamoto, Shizuoka (JP)

(73) Assignee: Yazaki Corporation, Tokyo (JP)

(*) Notice: Subject to any disclaimer, the term of this patent is extended or adjusted under 35 U.S.C. 154(b) by 287 days.

(21) Appl. No.: 10/309,106

(22) Filed: Dec. 4, 2002

(65) Prior Publication Data

US 2003/0103306 A1 Jun. 5, 2003

(30) Foreign Application Priority Data

Dec. 5, 2001 (JP) ........................................ 2001-371309

(51) Int. Cl.⁷ ................................................ H02H 3/24
(52) U.S. Cl. .............................. 361/92; 361/86; 361/23
(58) Field of Search ............................. 361/23, 86, 92, 361/88, 18, 58; 307/9.1, 10.1; 318/139, 254, 280, 282, 285, 362, 434, 443

(56) References Cited

U.S. PATENT DOCUMENTS

| | | | | |
|---|---|---|---|---|
| 4,562,387 A | * | 12/1985 | Lehnhoff | 318/285 |
| 4,575,662 A | * | 3/1986 | Lehnhoff | 318/282 |
| 5,041,940 A | * | 8/1991 | Sullivan | 361/18 |
| 5,396,118 A | * | 3/1995 | Yaguchi | 327/516 |
| 5,914,545 A | * | 6/1999 | Pollersbeck | 307/131 |
| 6,023,107 A | * | 2/2000 | Grass | 307/10.1 |
| 6,222,709 B1 | * | 4/2001 | Baba | 361/18 |
| 6,400,110 B1 | * | 6/2002 | Yabe et al. | 318/443 |
| 6,624,604 B2 | * | 9/2003 | Torikoshi et al. | 318/443 |

* cited by examiner

Primary Examiner—Ronald Leja
(74) Attorney, Agent, or Firm—Armstrong, Kratz, Quintos, Hanson & Brooks, LLP.

(57) ABSTRACT

A device for detecting failure of a field effect transistor (FET) includes a first FET1 connected in series with a motor M between a power source terminal and ground, a motor control unit 11 for on/off controlling a voltage to be applied to said motor to set normal/reverse operation and stopping of said motor, a gate control unit for on/off controlling a gate voltage to be applied to said FET to control driving of said motor, a voltage applying means VB, R1 for applying a positive voltage at a prescribed voltage level to the current input terminal of the FET; a voltage detecting unit CMP1 for detecting the voltage level of the positive voltage thus applied when said gate voltage is off; and a failure detecting unit 14 for detecting short-circuiting failure of the FET on the basis of a change in the voltage level detected by said voltage detecting unit when said gate voltage is off while said motor stops. In this configuration, failure of the FET for controlling driving of the motor can be detected both when the motor stops and operates.

4 Claims, 5 Drawing Sheets

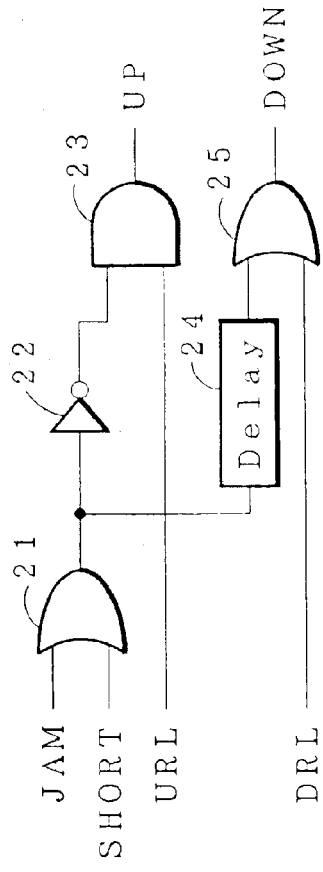
FIG. 2
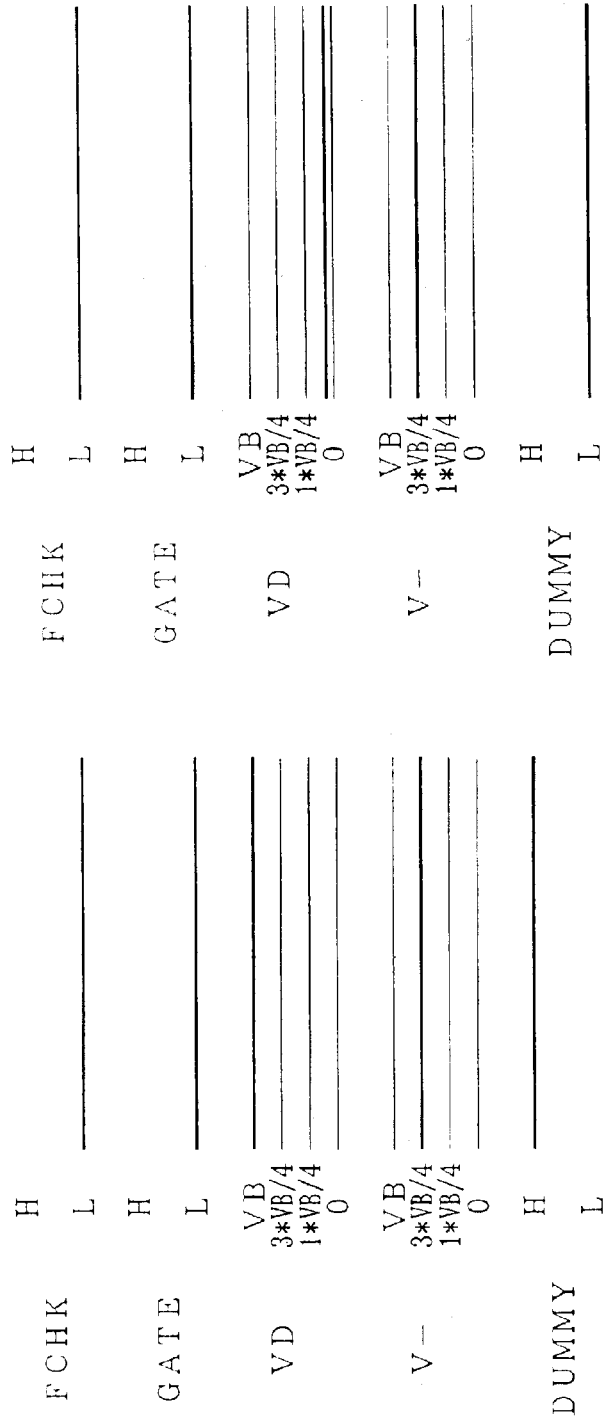
FIG. 3A
FIG. 3B

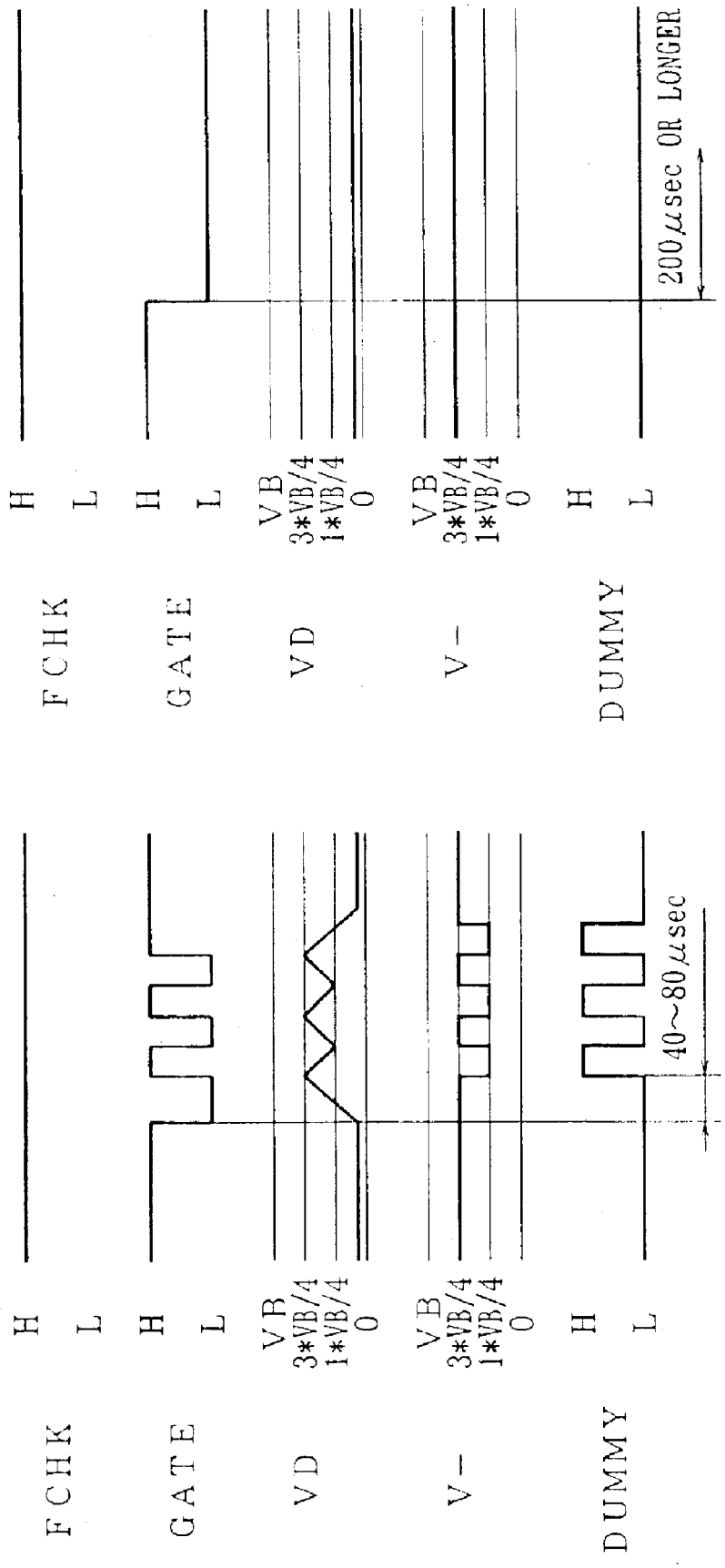

DEVICE FOR DETECTING FAILURE OF FIELD EFFECT TRANSISTOR

BACKGROUND OF THE INVENTION

1. Field of the Invention

This invention relates to a device for detecting short-circuiting failure of a field effect transistor (FET) which is used to control a motor for driving a power window equipped with an e.g. "finger-jammed" (hereinafter referred to as simply "jammed") preventing function.

2. Description of the Related Art

A proposed technique for detecting failure of the FET used for drive-control of the motor is to measure a drain current or reduction of a forward voltage due to excessive heating which is attributable to the excessive current flowing through the FET.

In the proposed technique, failure of the FET is detected on the basis of the changing rate of the drain current which is a load current flowing when a motor serving as the load is actually rotated in a state where the EET is connected to the motor.

However, the detection of the failure based on the drain current may provide the following disadvantages.
(1) Excessive load is applied to the motor so that when the large drain current flows the failure is erroneously detected.
(2) If a high threshold value for deciding the excessive drain current is set to detect the failure, when a finger is jammed in a power window, this fact can be recognized only after the drain current when the finger is tightened to apply the excessive load to the motor has been detected. This leads to an in crease in the load for detecting that the finger has been jammed.

SUMMARY OF THE INVENTION

This invention has been accomplished to overcome the above disadvantages.

An object of this invention is to provide a device for detecting failure of a field effect transistor to control the drive of a motor without setting the threshold value of an excessive drain current irrespectively of whether or not a motor is operating.

In order to attain the above object, in accordance with this invention, there is provided a device for detecting failure of a field effect transistor (FET) comprising:

a field effect transistor (FET) with a current input terminal and a current output terminal connected in series as well as a motor between a power source terminal and ground;

a motor control unit for turning on and off a voltage to be applied to the motor to set a normal/reverse rotation;

a gate control unit for turning on and off a gate voltage to be applied to the FET to control a motor driving;

a voltage applying means for applying a positive voltage at a prescribed voltage level to the current input terminal of the FET;

a voltage detecting means for detecting the voltage level of the positive voltage thus applied when the gate voltage is off; and a failure detecting means for detecting short-circuiting failure of the FET on the basis of a change in the voltage level detected by the voltage detecting means when the gate voltage is off while the motor stops, wherein it is determined that the FET is faulty due to short-circuiting when the voltage level at the current input terminal of the FET has fallen to ground potential while the gate voltage is off.

In this configuration, when the motor is stopped and the gate voltage is off, the short-circuiting failure is detected on the basis of the fact that the level at the current input terminal of the field effect transistor FET has fallen to the ground potential. Therefore, the short-circuiting failure of the field effect transistor FET1 while the motor stops can be easily detected.

Preferably, the failure detecting means detects that the FET is faulty due to short-circuiting when the voltage detecting means detects that the voltage applied to the current input terminal has fallen from the positive voltage during a prescribed period or longer after the gate voltage has changed from ON into OFF while the motor operates.

In accordance with this invention, in the state where the motor operation is effected to permit the load current to be supplied to the field effect transistor, when the gate of the field effect transistor is changed from ON to OFF, if it is detected that the voltage applied to the current input terminal has fallen from the positive voltage to the ground level, it is determined that the voltage level at the current input terminal has fallen to the ground level. In this way, the short-circuiting failure of the field effect transistor FET can be easily detected even while the motor operates.

Preferably, when failure due to the short-circuiting is detected by the failure detecting means, the motor control unit stops the motor and inverts the rotating direction of the motor.

In this configuration, when the short-circuiting failure is detected, the operation of the motor is stopped and the rotating direction of the motor is inverted so that its operation in the direction providing an excessive load is dissolved. Thus, the safety in the motor operation can be improved.

Preferably, the device for detecting failure of a field effect transistor (FET) further includes a failure detection mode setting unit for setting failure detection modes both when the motor stops and the motor operates.

In this configuration, the failure of the field effect transistor can be detected at any time in such a manner that the failure detecting mode while the motor stops or motor operates is set by the failure detection mode setting unit.

The above and other objects and features of this invention will be more apparent from the following description taken in conjunction with the accompanying drawings.

BRIEF DESCRIPTION OF THE DRAWINGS

FIG. 2 is a view showing an arrangement of a motor control section in an embodiment of this invention;

FIGS. 3A and 3B are views for explaining the detection of short-circuiting when a motor stops;

FIGS. 4A and 4B are views for explaining the detection of short-circuiting during an up-operation of the motor;

DESCRIPTION OF THE PREFERRED EMBODIMENTS

Figure 1:
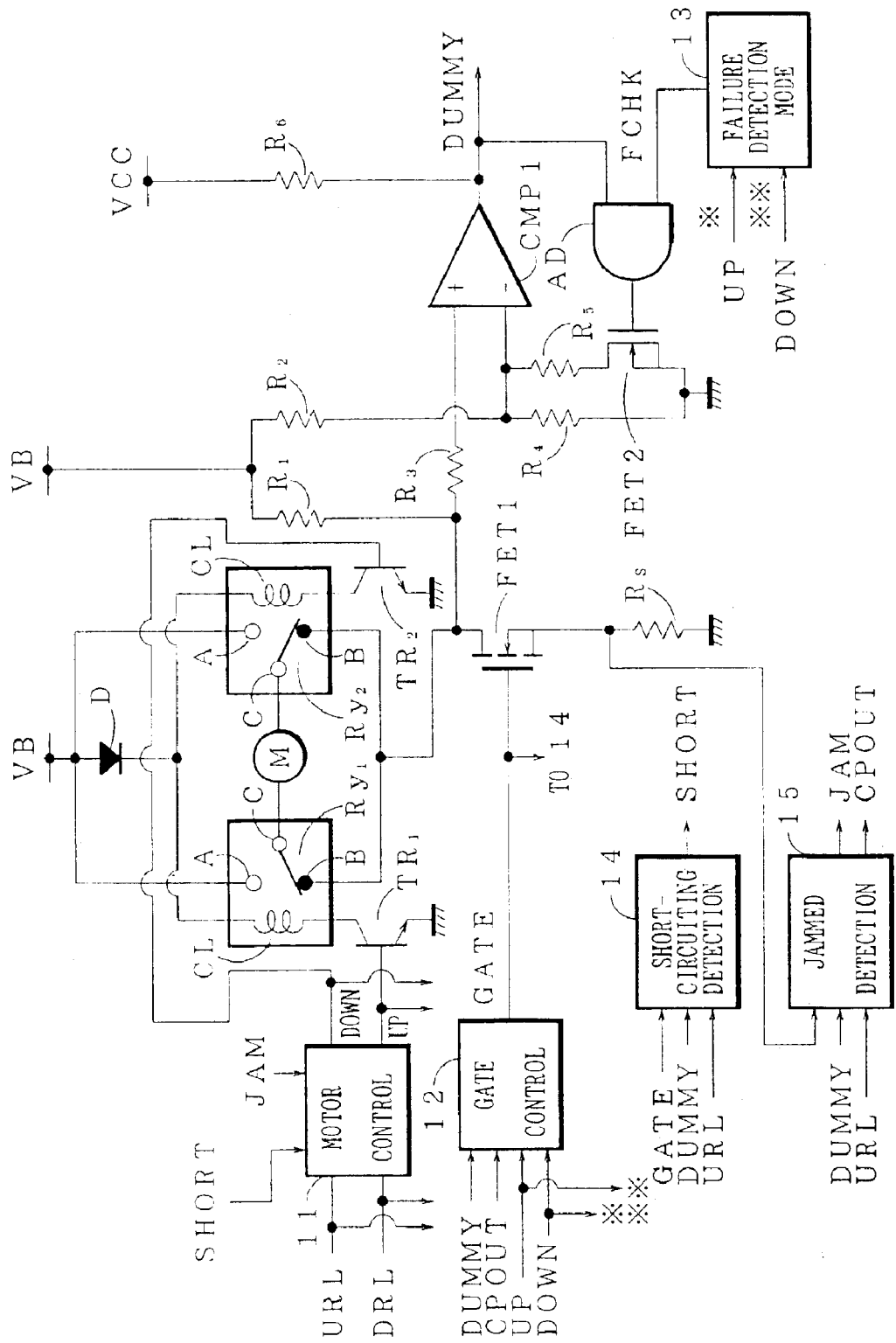
FIG. 1 is a view showing an arrangement of a device for detecting failure of an field effect transistor (FET) according to this invention.

Now referring to the drawings, an explanation will be given of a device for detecting the failure of an FET according to this invention. FIG. 1 is an arrangement view when a device for detecting failure of an field effect transistor (FET) according to this invention is applied to a motor circuit for driving a power window equipped with a "jammed" detecting function.

Referring to FIG. 1, normally open contacts A of relays Ry1 and Ry2, which are connected to the armature of a motor M for driving a power window through fixed contacts C, are commonly connected to a plus (+) terminal of a power source VB. Normally closed contacts B of the relays Ry1 and Ry2 are commonly connected to the drain of a field effect transistor FET1. The first terminals of exciting coils CL in the relays Ry1 and Ry2 are commonly connected to the plus (+) terminal of the power source VB through a diode D. The second terminals of the exciting coils CL are connected to the collectors of transistors TR1 and TR2 used for driving the relays which are emitter-grounded, respectively.

The bases of the transistors TR1 and TR2 are connected to an output terminal of a motor control unit 11. The motor control unit 11 receives an URL signal (hereinafter referred to as URL) for directing a window-up operation, a DRL signal (hereinafter referred to as DRL) for directing a window-down operation, a short-circuiting failure detecting signal (hereinafter referred to as SHORT) of the first field effect transistor FET1 and a "jammed" detecting signal (JAM) in the window.

In response to the URL, the motor control unit 11 supplies an UP signal serving as a normal rotation signal for the motor M to the base of the transistor TR1. In response to the DRL, the motor control unit 11 supplies a DOWN signal serving as a reverse rotation signal for the motor M to the base of the transistor TR2. The motor M drives the window toward an entirely-closing direction by the normal rotation and drives the window toward an entirely opening direction by the reverse rotation.

A gate control unit 12 is connected to the gate of the first field effect transistor FET1. The gate control unit 12 is supplied with the UP signal or the DOWN signal from the motor control unit 11. When a DUMMY or CPOUT at H level (which is at L level when the instantaneous value of the motor current crosses its mean value) at no-failure detection is supplied to the gate control unit 12, a gate signal (GATE) is supplied to the gate of the field effect transistor FET1.

A short-circuiting detecting unit 14 is supplied with the gate signal (GATE), DUMMY and URL. The URL serves to detect the short-circuiting while the motor operates or stops on the basis of the relationship in a signal level between GATE at H level and DUMMY when URL is at H level to produce the short-circuiting signal (SHORT).

A "jammed" detecting unit 15, when it is supplied with the URL and DUMMY, produces a "jammed" detecting signal (JAM) from the load current based on the voltage drop across the shunt resistance Rs for detecting the load current between the source of the field effect transistor FET1 and ground.

The drain of the field effect transistor FET1 is connected to the (+) input terminal of a comparator CMP1 (which constitutes a voltage detecting means or failure detecting means) through a current limiting resistor R3. A junction point of voltage dividing resistors R2 and R4 which are connected in series between the plus (+) terminal of the power source VB and ground is connected to the minus (−) terminal.

A series circuit of a resistor R5 and a second field effect transistor FET2 is connected in parallel to the voltage-dividing resistor R4 connected to ground. An output terminal of an AND gate AD which produces a signal at logic level corresponding to the failure detecting mode is connected to the gate of the field effect transistor FET2. The first input terminal of the AND gate AD is connected to the output terminal of the failure detection mode setting unit 13 which produces a logic level signal corresponding to the failure detecting mode (detection of short-circuiting when the motor stops and operates). The second input terminal of the AND gate AD is connected to the output terminal of the comparator CMP1 so as to receive DUMMY.

The output terminal of the comparator CMP1 is connected to a pull-up resistor R6. A resistor R1 is connected between the drain of the first field effect transistor FET1 and the plus (+) terminal of the power source VB so that a faint current flows through the drain. Incidentally, the power source VB and the resistor R1 constitute a voltage applying means.

FIG. 2 shows an example of a circuit configuration of the motor control unit 11. The motor control unit 11 includes an OR gate 21 with inputs supplied with JAM and SHORT, respectively, an AND gate 23 with a first input supplied with an output from the OR gate 21 via an inverter 22 and a second input supplied with the URL, which produces an output signal of UP to be supplied to the base of the transistor TR1, and an OR gate 25 with a first input terminal supplied with the output from the OR gate 21 through a delay circuit (Delay) 24 and a second input terminal supplied with DRL, which produces an output signal of DOWN to be supplied to the base of the transistor TR2.

In the circuit, when neither "jammed" nor short-circuiting are detected, i.e. JAM and SHORT at L level are supplied to the OR gate 21, the L level signal produced from the OR gate 21 is inverted into an H level signal. The H level signal is in turn supplied to the AND gate 23. At this time, if the URL at the H level which is a window-up signal is supplied to the other input terminal of the AND gate 23, the AND gate 23 supplies an UP signal at the H level to the base of the transistor TR1.

As a result, the transistor TR1 turns on so that a current flows through the exciting coil CL of the relay Ry1 and the contact is connected to the normally opened contact A. As for the motor M, the current flows along the passage of power source VB—relay Ry1—motor M—relay Ry2 so that the motor rotates in a normal direction. Thus, the window is driven toward the totally closed state.

When the "jammed" or short-circuiting is detected, while the window is driven toward the totally closed state, JAM or SHORT is at H level for a prescribed time (or distance). The output from the OR gate 21 is inverted in to L level by the inverter 22. The L level output from the inverter 22 is supplied to the AND gate 23 so that the UP signal becomes L level. Thus, the motor stops to operate. The output from the OR gate 21 is also supplied to the Delay 24. After 50 msec has elapsed, the Delay 24 supplies a signal at H level to the OR gate 25. As a result, the OR gate 25 supplies the DOWN signal at H level to the base of the transistor TR2 so that the motor starts the reverse rotation to drive the window toward the totally opened state.

When the transistor TR1 turns off, the contact of the relay Ry1 returns to the normally closed contact B. Further, when transistor TR2 turns on, a current flows through the exciting coil CL of the relay Ry2 so that the contact is connected to the normally opened contact A. As for the motor M, the current flows in the course of power source VB—normally-opened contact A of relay Ry2—motor M—the normally-closed contact B of the relay Ry1—first field effect transistor FET1—ground. Thus, the motor rotates in the reverse direction so that the window is driven toward the totally opened state.

Incidentally, if DRL is at H level, irrespectively of the signal level of both JAM and SHORT, the OR gate 25 supplies DOWN signal at H level to the base of the transistor TR2 so that the motor is rotated in the reverse direction to drive the window toward the totally opened state.

Figure 5:
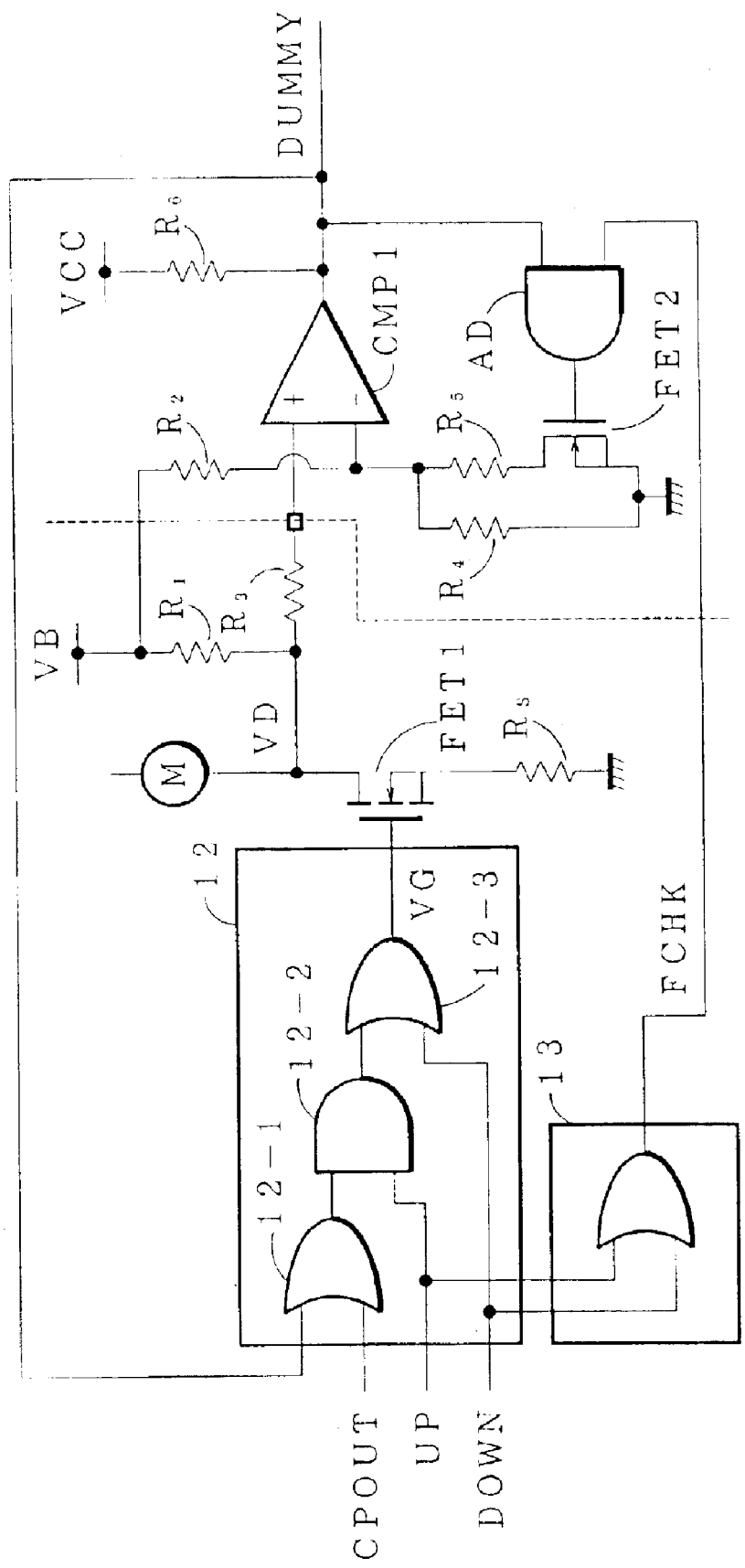
FIG. 5 is a view showing the details of a failure detecting section in a device for detecting failure of an field effect transistor (FET) according to an embodiment of this invention.
Figure 6:
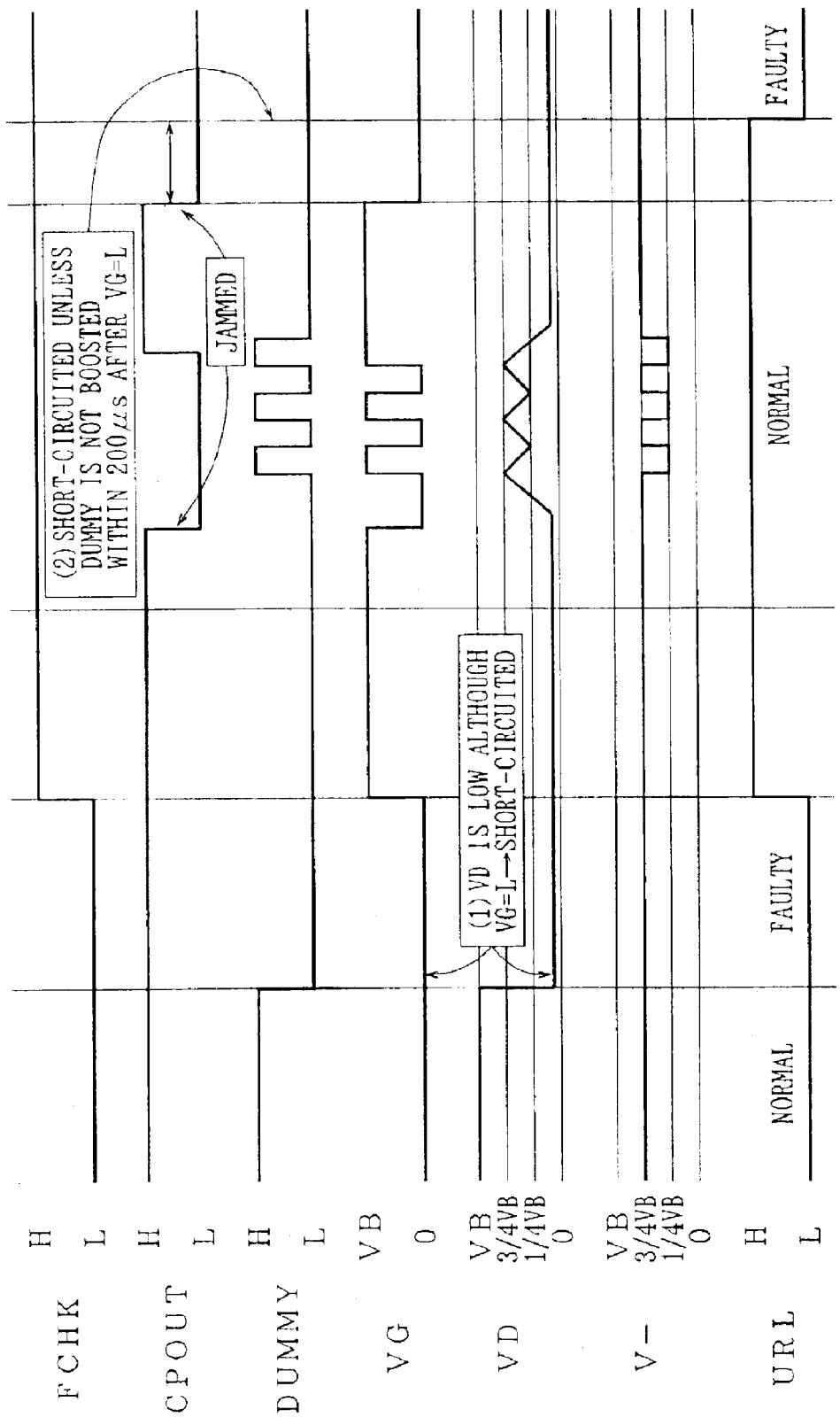
FIG. 6 is a timing chart for explaining the operation of detecting failure and "jammed" in the device for detecting failure of an field effect transistor (FET) shown in FIG. 5.

The gate control unit 12, as shown in FIG. 5, includes an OR gate 12-1 to which DUMMY and CPOUT are to be supplied, an AND gate 12-2 to which the output from the OR gate 12-1 and UP from the motor control unit 11 are to be supplied, and an OR gate 12-3 to which the output from the AND gate 12-2 and DOWN from the motor control unit 11 are to be supplied As seen from the timing chart shown in FIG. 6, the gate control unit 12, in the upward operation of the power window, while UP based on URL at H level is supplied to the AND gate 12-2, when DUMMY or CPOUT at H level is supplied to the OR gate 12-1, the OR gate 12-1 supplies the H level signal to the AND gate 12-1.

As a result, when the AND gate 12-2 supplies the H level signal to the OR gate 12-3 at the subsequent stage so that the gate voltage VG is applied to the first field effect transistor FET1. At this time, since the first field effect transistor FET1 turns on, a current flows through the motor M. Incidentally, it should be noted that when the first field effect transistor FET1, which is normal, turns on or off, the drain voltage VD changes.

When both UP and DOWN are at L level, the motor control unit 11 supplies the L level signal to the base of each of the transistors TR1 and TR2. Thus, the contacts of the relays Ry1 and Ry2 are changed from the totally opened contact A into the totally closed contact B so that the motor M is separated from the power source. The output from the OR gate 12-3 in the gate control unit 12 is at L level so that the gate voltage VG is not applied to the first field effect transistor FET1.

The failure detection mode setting unit 13, as shown in FIG. 5, is constructed of an OR gate. In response to UP and DOWN, the failure detecting mode setting unit 13 sets the short-circuiting failure detection mode while the motor stops. When the failure-detection setting mode is set, the failure detection signal FCHK becomes at the L level, and is supplied to the AND gate AD. In this case, since the output from the AND gate AD is at L level, the field effect transistor FET2 turns off. The divided voltage applied to the minus (−) input terminal of a comparator CMP1 is determined by the ratio of resistors R2 to R4. The divided voltage is ¾ VB.

When UP at H level is applied to the gate control unit 12, the gate voltage VG at H level is applied to the gate of the first field effect transistor FET1 through the AND gate 12-2 and OR gate 12-4. At this time, the first field effect transistor FET1 turns on so that the current flows through the motor M.

The failure detection mode setting unit 13 sets the short-circuiting detection mode while the motor operates, and supplies FCHK at H level to the AND gate AD. At this time, DUMMY is pulled up to voltage VCC (H level) by resistor R6 and applied to the input terminal of the AND gate AD. Thus, the AND gate AD applies the gate voltage to the field effect transistor FET2. When the field effect transistor FET2 turns on, since the resistor R4 is connected in parallel to the resistor R5, the divided voltage applied to the minus input terminal of the comparator CMP 1 is changed into ¼ VB.

Referring to the drawings, an explanation will be given of an embodiment of the failure detecting operation according to this invention.

Detection of Short-Circuiting Failure When the Motor Stops
Where the FET1 is Normal.

First, referring to the output characteristic graph of FIG. 3A, the operation when the FET1 is normal will be explained below.

While the motor stops, since URL and DRL are at L level, DOWN and UP supplied to the bases of the transistors TR1 and TR2 by the motor control unit 11 are at L level. Thus, the transistors TR1 and TR2 are turned off and the relays Ry1 and Ry2 are not operated. The fixed contacts C of the relays Ry1 and Ry2 are connected to the totally closed contacts B so that the motor M is separated from the power source.

The DOWN and UP at L level are also supplied to the gate control unit 12 so that the gate of the first field effect transistor FET1 is changed into L level through the gate control unit 12. The DOWN and UP at L level are also supplied to the failure detection mode setting unit (OR gate) 13 so that FCHK (failure detection signal) at L level is supplied to the AND gate AD. Since the L level signal is supplied to the gate of the field effect transistor FET2, the FET2 turns off.

When the field effect transistor FET2 turns off, the divided voltage resistor R5 is separated from the resistor R4 so that the reference voltage applied to the minus (−) input terminal of the comparator CMP1 is ¾ VB which is obtained by dividing the power source voltage VB at the resistance ratio of the dividing voltage resistors R2 and R4. The voltage VD applied to the plus (+) input terminal of the comparator CMP1 is the power source voltage which appears across the resistor R1 when the first field effect transistor FET 1 is off.

In this way, since VB is applied to the plus (+) input terminal of the comparator CMP1 and ¾ VB (<VD=VB) is applied to the minus (−) input terminal thereof, the output from the CMP1 is DUMMY at H level of potential VCC by pull-up resistor R6. When DUMMY is at H level, it is determined that the first field effect transistor FET1 is normal.

When the FET1 is Faulty

However, under the above condition, when FET1 has been short-circuited, although GATE from the gate control unit 12 is at L level, the power source voltage VB is connected to ground through the resistor R1, first field effect transistor FET1 and shunt resistor Rs so that the drain voltage VD of the first field effect transistor FET1 is approximately zero. Thus, the output (DUMMY) from the comparator CMP1 is inverted into L level.

The DUMMY at L level is supplied to the gate control unit 12 The DUMMY at L level is also supplied to the short-circuiting failure detecting unit 14 and collated with the GATE at L level. In this way, it is determined that the first field effect transistor FET1 is short-circuited in failure while the motor stops. The SHORT at L level from the failure detecting unit 14 is supplied to the motor control unit 11, thereby stopping the entire failure detecting device. In this case, it should be noted that URL is at L level.

Detection of Short-circuiting Failure While the Motor Operates

Where the FET1 is Normal

First, referring to the output characteristic graph of FIG. 3A, the operation when the FET1 is normal will be explained below.

While the motor operates, since CPOUT and UP are at H level, the gate of the first field effect transistor FET1 is located at H level by the gate control unit 12 so that the FET1 is in the ON state.

Since UP at H level is applied to the failure detection mode setting unit (OR gate) 13, FCHK at H level is supplied to the AND gate AD.

At this time, the first field effect transistor FET1 becomes ON so that the drain voltage VD lowers to approximately 0V, which is supplied to the (+) input terminal of the comparator CMP1. Thus, the level of DUMMY supplied to the AND gate AD is at L level.

In this case, the output from the AND gate AD is at L level so that the field effect transistor FET2 turns off. Thus, the voltage (V−) applied to the minus (−) input terminal of the comparator CMP1 is ¾VB.

When GATE becomes L level, the first field effect transistor FET1 turns off. At this time, the drain voltage VD rises abruptly from the vicinity of 0.

When the drain voltage VD exceeds the voltage (V−) applied to the minus (−) input terminal of the comparator CMP1, DUMMY becomes H level, which is supplied to the gate control unit 12. At this time, the field effect transistor FET2 turns on. Thus, the voltage (V−) applied to the (−) input terminal of the comparator CMP1 is ¼VB.

Since GATE is at H level when GATE is at H level, the first field effect transistor FET1 turns on. When the drain voltage VD lowers from ¼ VB, DUMMY becomes L level. Thus, since the voltage (V−) applied to the (−) input terminal of the comparator CMP1 becomes ¾ VB, and GATE is at L level, the first field effect transistor FET1 turns off. When the drain voltage VD rises and exceeds ¾ VB, DUMMY is inverted into H level so that the field effect transistor turns on.

In this way, the on/off operation of the first field effect transistor FET1 on the basis of the level inverting operation of DUMMY is repeated until an abrupt increase in the current flowing through the first field effect transistor FET1 becomes stable.

Where the first field effect transistor FET1 is normal, the period from when GATE becomes L level to when DUMMY becomes H level is not longer than 100 μsec.

According to this embodiment, when an excessive load current flows through the first field effect transistor FET1 while the motor operates, the first field effect transistor FET1 repeats the ON/OFF operation until the current becomes stable. This reduces the load current.

Where the FET1 is faulty

GATE and DUMMY produced while the motor operates as well as URL are supplied to the short-circuiting failure detecting unit 14. If DUMMY does not become H level ever after 200 μm or longer elapses from when GATE changes from H level to L level, it is decided that the FET1 is in the short-circuiting failure. SHORT at H level which is a short-circuiting failure detecting signal is supplied to the motor control unit 11. The reason therefor is as follows.

Unless the first field effect transistor FET1 is in the short-circuited state, assuming that GATE is at L level, the drain voltage VD is higher than the reference voltage applied to the minus (−) input terminal of the comparator CMP1.

However, if the first field effect transistor FET1 is in the short-circuited state, although GATE is at L level, the FET1 is in the conductive state. Therefore, the drain voltage VD falls to the vicinity of 0 V and hence becomes lower than the reference voltage of the comparator CMP1 so that DUMMY remains at L level.

When the motor control unit 11 detects the short-circuiting while the window is driven toward the totally closed state, SHORT is at H level for a prescribed time (or distance) and supplied to the OR gate 21. The output from the OR gate 21 is inverted into L level by the inverter. The inverted signal is supplied to the AND gate 23. The UP signal becomes L level to stop the motor operation. The output from the OR gate is supplied to the Delay 24 and after 50 msec elapses, the signal at H level is supplied from the Delay 24 to the OR gate 25. As a result, since the OR gate 25 supplies the DOWN signal at H level to the base of the transistor TR2, the motor starts an inverting operation. Thus, the window is driven toward the totally opened state.

The "jammed" detecting unit 15, when URL is at H level, the input DUMMY is at L level and an excessive current flowing through the first field effect transistor FET1 is detected on the basis of the voltage drop across the shunt resistance Rs, supplies CPOUT at H level to the gate control unit 12 and JAM at H level to the motor control unit 11.

As a result, the gate control unit 12 supplies GATE at H level to the first field effect transistor FET1. If the "jammed" is detected while the window is driven toward the totally closed state, the motor control unit 11 supplies JAM at H level for a prescribed time (or distance) to the OR gate 21. The output from the OR gate 21 is inverted into L level by the inverter 22. The L level signal is supplied to the AND gate 23. The UP signal becomes L level to stop the motor operation.

The output from the OR gate 21 is also supplied to the Delay 24. When 50 msec elapses, the Delay 24 supplies the H level signal to the OR gate 25. As a result, the OR gate 25 supplies the DOWN signal at H level to the base of the transistor TR2. Thus, the motor M starts the inverting operation to drive the window toward the totally opened state.

As described above, in accordance with this embodiment, the short-circuiting failure is detected on the basis of a change in the logic level of DUMMY according to a failure detection mode, and the finger "jammed" by the power window is detected on the basis of an increase in the drain current due to the voltage drop across the shunt resistor.

Therefore, since the drain current is not used when the short-circuiting failure is detected, the threshold value for detecting the finger "jammed" can be set at a small value. Thus, the load for detecting the finger "jammed" in the power window will not be increased.

Incidentally, the contents of Japanese Patent Appln. No. 20001-371309 filed on Dec. 5, 2001 are hereby incorporated by reference.

What is claimed is:

1. A device for detecting failure of a field effect transistor (FET) comprising:

a field effect transistor (FET) with a current input terminal and a current output terminal connected in series as well as a motor between a power source terminal and ground;

a motor control unit for turning on and off a voltage to be applied to said motor to set a normal/reverse rotation;

a gate control unit for turning on and off a gate voltage to be applied to the FET to control a motor driving;

a voltage applying means for applying a positive voltage at a prescribed voltage level to the current input terminal of the FET;

a voltage detecting means for detecting the voltage level of the positive voltage thus applied when said gate voltage is off; and a failure detecting means for detecting short-circuiting failure of the FET on the basis of a change in the voltage level detected by said voltage detecting means when said gate voltage is off while said motor stops, wherein it is determined that said FET is faulty due to short-circuiting when the voltage level at the current input terminal of the FET has fallen to ground potential while the gate voltage is off.

2. A device for detecting failure of a field effect transistor (FET) according to claim 1, wherein said failure detecting means detects that said FET is faulty due to short-circuiting when said voltage detecting means detects that said voltage applied to said current input terminal has fallen from the positive voltage during a prescribed period or longer after said gate voltage has changed from ON into OFF while the motor operates.

3. A device for detecting failure of a field effect transistor (FET) according to claim 1, wherein when failure due to said short-circuiting is detected by said failure detecting means, said motor control unit stops the motor and inverts the rotating direction of the motor.

4. A device for detecting failure of a field effect transistor (FET) according to claim 1, further comprising a failure detection mode setting unit for setting failure detection modes both when said motor stops and said motor operates.

* * * * *